United States Patent
Hafer et al.

(10) Patent No.: US 12,235,046 B2
(45) Date of Patent: Feb. 25, 2025

(54) DEVICE AND METHOD BY WHICH THE PROCESS CONTROL, IN PARTICULAR TEMPERATURE CONTROL, OF A METAL PRODUCT PASSED THROUGH ALONG A SINGLE RUNNING-THROUGH LINE IS FLEXIBLY INFLUENCED BY MEANS OF AT LEAST TWO ADJACENT SEGMENTS

(71) Applicant: SMS group GmbH, Düsseldorf (DE)

(72) Inventors: Joachim Hafer, Siegen (DE); Matthias Peters, Kreuztal (DE); Kilian Kaupper, Recklinghausen (DE)

(73) Assignee: SMS group GmbH, Düsseldorf (DE)

( * ) Notice: Subject to any disclaimer, the term of this patent is extended or adjusted under 35 U.S.C. 154(b) by 407 days.

(21) Appl. No.: 17/784,395

(22) PCT Filed: Dec. 10, 2020

(86) PCT No.: PCT/EP2020/085639
§ 371 (c)(1),
(2) Date: Aug. 1, 2022

(87) PCT Pub. No.: WO2021/116350
PCT Pub. Date: Jun. 17, 2021

(65) Prior Publication Data
US 2022/0412653 A1    Dec. 29, 2022

(30) Foreign Application Priority Data

Dec. 11, 2019  (DE) ...................... 10 2019 219 343.9
May 15, 2020  (DE) ...................... 10 2020 206 176.9

(51) Int. Cl.
*F27B 19/04*   (2006.01)
*F27B 9/02*    (2006.01)
*F27D 3/00*    (2006.01)

(52) U.S. Cl.
CPC .............. *F27B 9/029* (2013.01); *F27B 19/04* (2013.01); *F27D 3/0024* (2013.01); *F27D 2003/0042* (2013.01)

(58) Field of Classification Search
CPC .......... F27B 9/029; F27B 9/028; F27B 19/04; F27B 9/021; F27D 3/0024
See application file for complete search history.

(56) References Cited

U.S. PATENT DOCUMENTS

| | | | |
|---|---|---|---|
| 4,217,095 A | | 8/1980 | Tokitsu |
| 5,182,847 A | * | 2/1993 | Guse ................... C21D 9/0081 29/33 C |

(Continued)

FOREIGN PATENT DOCUMENTS

| | | |
|---|---|---|
| CN | 1086465 A | 5/1994 |
| CN | 1135941 A | 11/1996 |

(Continued)

*Primary Examiner* — Gregory A Wilson
(74) *Attorney, Agent, or Firm* — Smartpat PLC

(57) ABSTRACT

A device and a method are described by which the process control, in particular temperature control, of a metal product passed through along a single running-through line is flexibly influenced by means of at least two adjacent segments. By exchanging segments, the process control can be adapted quickly and flexibly to a wide variety of metal products.

22 Claims, 4 Drawing Sheets

(56) References Cited

U.S. PATENT DOCUMENTS

| | | | |
|---|---|---|---|
| 5,467,518 A * | 11/1995 | Mertens | C21D 9/0081 |
| | | | 29/33 C |
| 5,564,178 A | 10/1996 | Takashima et al. | |
| 5,601,137 A | 2/1997 | Abe et al. | |
| 5,769,149 A * | 6/1998 | Mertens | B21B 1/466 |
| | | | 29/33 C |
| 5,970,594 A * | 10/1999 | Borsi | B21B 1/466 |
| | | | 29/81.08 |
| 6,062,055 A * | 5/2000 | Bobig | B21B 1/466 |
| | | | 72/200 |
| 6,071,362 A * | 6/2000 | Mertens | B21B 1/466 |
| | | | 148/541 |
| 6,289,972 B1 | 9/2001 | Benedetti | |
| 6,463,777 B1 | 10/2002 | de Curraize et al. | |
| 8,011,418 B2 * | 9/2011 | Rosenthal | B21B 1/46 |
| | | | 164/269 |
| 2010/0147484 A1 | 6/2010 | Rosenthal et al. | |
| 2012/0160377 A1 | 6/2012 | Seidel et al. | |
| 2016/0282063 A1 | 9/2016 | Seidel et al. | |

FOREIGN PATENT DOCUMENTS

| | | | | |
|---|---|---|---|---|
| CN | 1306463 | A | 8/2001 | |
| CN | 1840251 | A | 10/2006 | |
| CN | 101848780 | A | 9/2010 | |
| CN | 102549173 | B | 7/2014 | |
| DE | 4017928 | A1 | 12/1991 | |
| DE | 4137547 | A1 | 5/1993 | |
| DE | 4234455 | A1 | 4/1994 | |
| DE | 19524082 | | 1/1997 | |
| DE | 102008020412 | A1 | 2/2009 | |
| DE | 102010008292 | A1 * | 8/2011 | ........... B21B 39/004 |
| DE | 102013223040 | A1 | 5/2015 | |
| EP | 0724920 | A1 | 8/1996 | |
| EP | 0870553 | B1 | 5/2003 | |
| EP | 2767600 | A1 | 8/2014 | |
| EP | 2462248 | B1 | 3/2018 | |
| JP | H04228248 | A | 8/1992 | |
| JP | H06218401 | A | 8/1994 | |

* cited by examiner

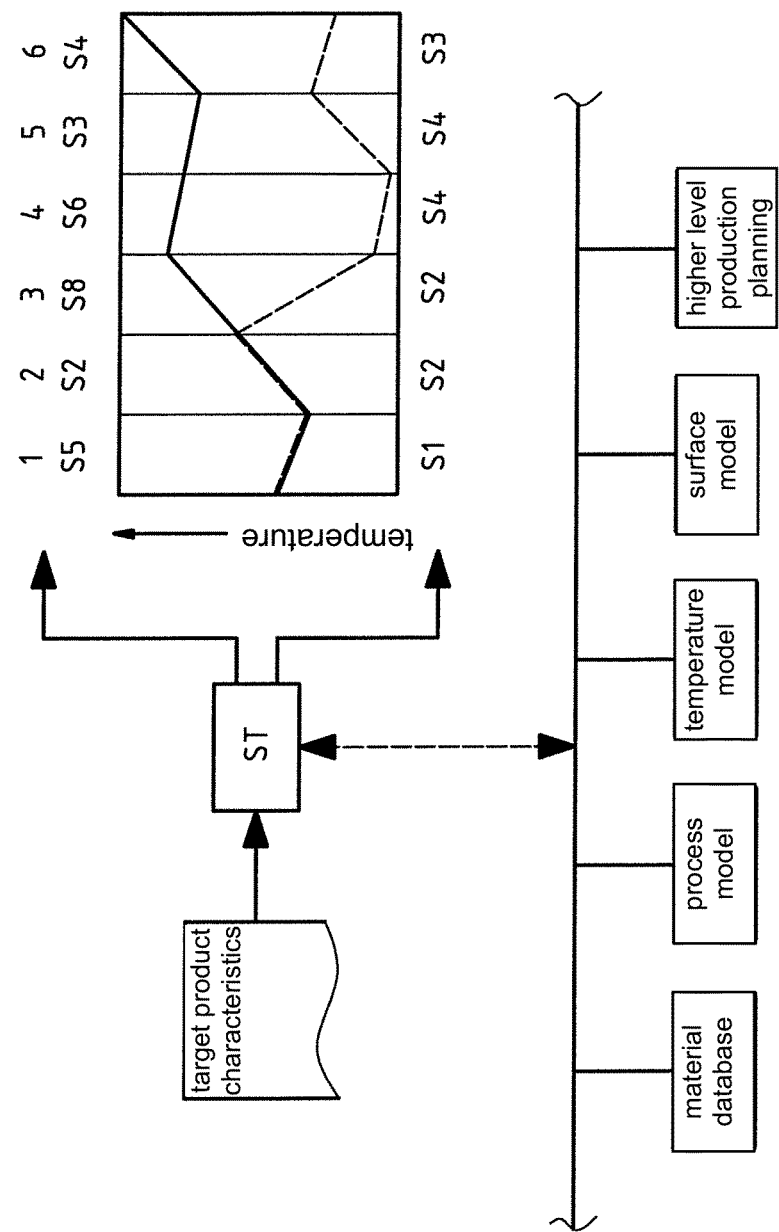

DEVICE AND METHOD BY WHICH THE PROCESS CONTROL, IN PARTICULAR TEMPERATURE CONTROL, OF A METAL PRODUCT PASSED THROUGH ALONG A SINGLE RUNNING-THROUGH LINE IS FLEXIBLY INFLUENCED BY MEANS OF AT LEAST TWO ADJACENT SEGMENTS

TECHNICAL FIELD

The disclosure relates to a device and a method by which the process control, in particular temperature control, of a metal product passed through along a single running-through line is flexibly influenced by means of at least two adjacent segments.

BACKGROUND

Metal products usually undergo a variety of heat treatments with different objectives during their manufacture. Thereby, the heat treatment can include heating, holding, cooling steps or even a surface treatment with a gas, for example. Such heat treatment lines are typically designed and built to be optimized for a specific metal product or group of metal products. A change in temperature control, for example the targeted cooling within a holding zone of a furnace, is difficult to implement in an existing heat treatment line, since furnaces typically react very sluggishly to changed temperature specifications.

Therefore, a change of a temperature control can only be carried out with a corresponding time delay or downtimes in production. Likewise, changes to the gas, in particular for large furnace segments, are very time-consuming, since appropriate purging times must be observed for safety reasons. A fundamental exchange of a heating method, for example, natural gas-fired furnace for induction heating, is not possible. Likewise, the exchange of such segments for maintenance purposes is only possible in the event of a production interruption or a restriction of production capabilities.

SUMMARY

It is an object of the disclosure to further design a known heat treatment line in such a manner that the process control, in particular temperature control, can be adapted more flexibly to different metal products and/or production conditions.

The object is achieved with a device and a method as disclosed herein. By means of at least two segments arranged one behind the other in a running-through line, the process control, in particular temperature control, of a metal product, in particular a slab, thin slab or pre-rolled hot strip, passed through along a single running-through line is influenced, wherein at least one segment can be exchanged for another segment in a continuous operation by means of a transport operation by a transport device comprising a drive unit. At least one segment is designed as a furnace, an enclosed transport section, an open transport section and/or a cooling section, and another furnace segment can be positioned next to a first furnace segment.

"One behind the other in a running-through line" is understood to refer to segments being arranged inside the running-through line and thus participate in the production process, whereas an adjacent segment is arranged outside the running-through line, preferably laterally spaced therefrom. A continuous operation within the meaning of the disclosure can also consist of a plurality of individual work steps. Such work steps are carried out consecutively or simultaneously without any significant time delay. A drive unit can be both a linear drive and a rotary drive. The drive can preferably be electric, pneumatic or hydraulic. The drive unit can be arranged externally and act only on the segment or can be arranged on the segment.

The segments, which are exchangeable with one another, are arranged on a common support structure, preferably rails and/or preferably transverse and/or parallel to the running-through line of the adjacent segment. Process control within the meaning of the disclosure can also include the recording of process data and/or product data for controlling or regulating the device and/or for storage in a higher-level data processing system. Exchanging a segment with another segment for maintenance purposes is also understood as process control.

Preferably, the transport device can exchange one segment for another segment simultaneously by means of a transport operation. Within the meaning of the disclosure, "simultaneously" means that as one segment is moved out of the running-through line, another is synchronously moved into the running-through line.

Preferably, the segments are attached to the support structure in a movable and/or detachable manner. As a result, the segments on the support structure are exchangeable and, if there is a fundamental change in the product to be manufactured, can be easily replaced by different segments and brought into the running-through line.

From an external position, a segment can preferably be attached to the support structure. In particular upon application during ongoing operation, different metal products and/or materials can be produced flexibly in conjunction with appropriate production planning.

In accordance with the disclosure, at least two segments are arranged on a common support structure. Ideally, ≥3 segments can be attached to the support structure. This shortens the time required to change the process control.

Preferably, the support structure has at least one coupling and/or at least one support plate for connecting a plurality of segments. This allows different segments to be transported simultaneously via a common drive device. In the case of a coupling, the segments are arranged directly on the support structure; in the case of a support plate, the segments are mounted together on a flat structure that is attached to the support structure.

At least one segment preferably has rollers for conveying the metal product along the running-through line. The use of rollers to convey the metal product reduces the likelihood of surface damage. In particular if high temperatures are present during conveying.

A furnace segment ideally features an inductive heater. This allows the metal product to be heated quickly, in particular shortly before a pass in a roll stand, for example.

Preferably, a furnace segment has at least one furnace door, preferably two furnace doors, for sealing the furnace chamber from the atmosphere. This allows, for example, a targeted furnace atmosphere to be maintained outside the running-through line and reduces the purging time when the furnace segment is reinserted into the line. Furthermore, this reduces energy losses due to the cooling of the furnace segment.

A segment, preferably an exchangeable segment, preferably has a measuring device, preferably for recording surface quality. This means that measuring equipment can only be used if it is deemed necessary for the metal product, thus saving maintenance costs.

Preferably, a segment has a device for treating the surface, in particular by scorching, descaling, blowing off and/or grinding. In particular, if there are several exchangeable segments and/or a surface inspection takes place beforehand, the surface of a metal product can be treated flexibly in different manners and brought to a desired state. This can improve metallic yield by using only the treatment method that removes the defects with the least amount of material removal.

At least one segment preferably has a positioning means for aligning the segment in the running-through line. The positioning means allows the segment to be securely positioned along the running-through line, thereby improving the passage of the metal product through the entire device.

Segments, preferably segments adjacent to one another, ideally have complementary coupling components for detachably connecting the segments to one another. Coupling, in particular in conjunction with bracing of the segments against one another, improves the rigidity of the entire device and thus the passage of the metal product through the device.

Preferably, a plurality of the segments, more preferably all of the segments, of the device are exchangeable by means of the transport device. This increases flexibility compared to concepts from the prior art.

Preferably, a roughing stand of a hot rolling train is arranged at the beginning of the running-through line; preferably, a finishing stand of a hot rolling train is arranged at the end of the running-through line. Between such two rolling trains, a metal product of particularly high quality can be produced by means of special temperature control, preferably in conjunction with detection of surface defects and/or elimination of surface defects.

A higher-level control or regulation system is ideally available for the segments. The configurations made possible by the flexible use of the segments can be exploited to particular advantage if the use of the segments and the segments themselves are controlled or regulated, preferably fully automatically and online. In particular if the control or regulation system is connected to a higher-level production planning or control system.

Furthermore, the object of the disclosure is achieved with a method as disclosed herein. For influencing the process control, in particular temperature control, of a metal product, in particular a slab, thin slab or a pre-rolled hot strip, which is passed through along a running-through line by means of at least two segments arranged one behind the other in the running-through line, the process control, in particular temperature control, is changed along the running-through direction of the metal product by exchanging a segment. The exchange of one segment for another, adjacent, segment takes place in one continuous operation by means of a transport operation by a transport device. The segments arranged on a common support structure are moved, preferably on rails and/or preferably transversely to the running-through line of the adjacent segment.

Ideally, the segments are exchanged within 30 min, preferably 15 min., even more preferably within 5 min. Such short changeover intervals reduce the production interruption in the entire manufacturing process in the event of a necessary changeover in process control.

Preferably, the control and or regulation system influences the process control, in particular temperature control, and, on the basis of predetermined data, preferably automatically, causes a segment to be exchanged and/or acts on the individual segment in order to change the process control. This reduces the likelihood of errors in system operation and simplifies handling and guidance of the system.

Preferably, the control or regulation system determines suitable materials of the metal products for the segments present in the running-through line or for the material of a metal product through the segments to be arranged in the running-through line. In the first case, a possible changeover of a segment can be omitted by an adapted production planning or a necessary changeover of a segment can be brought about in a targeted manner. Both can increase the productivity of the system.

The metal product is preferably transported along the running-through line by means of rollers. Surface defects are particularly difficult to eliminate in slabs or thin slabs along with the roughing strip after a roughing stand. Rollers here reduce the probability of surface defects.

BRIEF DESCRIPTION OF THE DRAWINGS

FIG. 4 shows a change of process control with temperature curves.

DETAILED DESCRIPTION

The invention is described in detail below with reference to the above figures in the form of exemplary embodiments. In all figures, the same technical elements are designated with the same reference signs.

Figure 1:
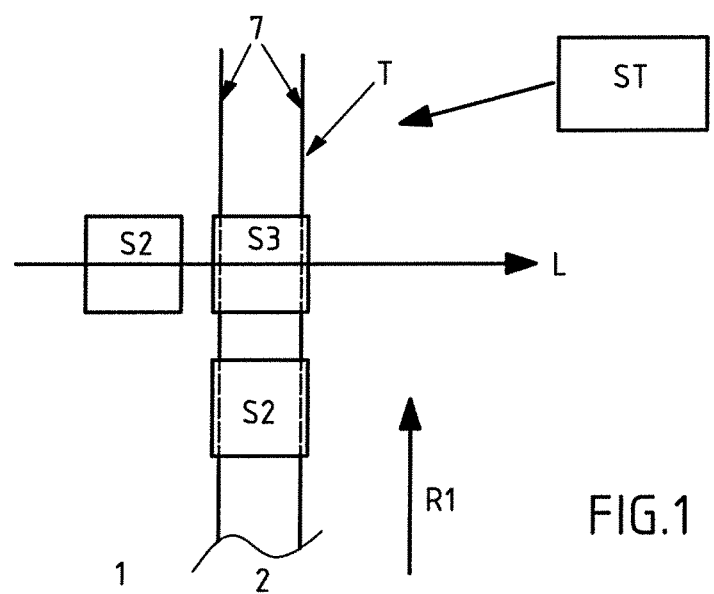
FIG. 1 is a system diagram of a heat treatment line with one fixed segment and one exchangeable segment.

FIG. 1 shows a system diagram for a device with two segments S2, S3 following one another in the running-through line L. A fixed furnace segment S2 with a gas firing device is located at position 1. At position 2, an induction furnace segment S3 can be exchanged for another furnace segment with gas firing device S2. At position 2, a transport device T is provided, which is connected in terms of signal technology to a control system ST. The segments are arranged on a support structure 7. By actuating the drive device T, a transport operation can be performed on the support structure 7, such that the segment S3 is exchanged for the segment S2. For this purpose, both segments are moved in the direction of arrow R1.

FIGS. 2a, 2b, and 2c each show a system diagram for the device. In the exemplary embodiment in accordance with FIG. 2a, two segments are arranged in succession in the running-through line L. Thereby, in position 1, this is a gas-fired furnace segment S2, and in position 2, it is an enclosed roll table S4. Both segments are in principle exchangeably arranged on support structures 7, but only segment S4 has two available exchangeable segments S1, S3. In the present example, such exchangeable segments are an induction furnace segment S3 and a roll table S1, which are also arranged on the support structure 7 at position 2. The support structure 7 belonging to position 1 does not have any other exchangeable segments, but is designed to accommodate exchangeable segments if required. In addition to the available support structures 7, another exchange segment S8, in the form of a rapid cooling device, is placed on a parking position 9, which can be positioned on the support structures 7 if required. An overhead crane is recommended for this purpose in this exemplary embodiment. All segments of this exemplary embodiment have individual drive devices D, which can set a segment in motion individually. Preferably, a motorized drive is used for this purpose. In this exemplary embodiment, the support structures 7 are designed as rail systems on which the segments can be exchanged in a moving or sliding manner.

To exchange segment S4, all couplings to the associated media supply must be detached; any couplings to segments in the running-through direction D must also be detached. A segment is exchanged through the collision-free, preferably synchronous, transport of all three exchange segments S1, S4 and S3 perpendicular to the running-through line in one of the two directions of the double arrow R2. The exchangeable segments can be transported synchronously for two or three segments. Alternatively, a sequential transport can also be performed. The individual drive of the segments enables such flexibility. If the roll table S1 is to be transported into the running-through line L, it must be transported to the left as seen from the running-through direction L, If the induction furnace segment S3 is to be transported to the running-through line L, it must be transported to the right as viewed from the running-through direction L.

In the exemplary embodiment in accordance with FIG. 2b, two segments are arranged in succession in the running-through line L. Thereby, in position 1, this is a gas-fired furnace segment S2, and in position 2, it is an induction furnace segment S3. Only segment S3 is exchangeably arranged on a support device 7, and has two available exchangeable segments in the form of a roller table with a surface inspection device S5 and a roll table S1. The segment at position 1 is a fixed furnace segment with a gas firing device S2. An unoccupied parking position 9 is located in close proximity to the segments.

The exchange segments of position 2 are detachably connected to one another. In this exemplary embodiment, all three segments S1, S3 and S5 are arranged on a common platform P, which takes over the connection of the segments S1, S3 and S5. The connection could also be taken over by a rod or comparable forms. Due to the illustrated connection or common arrangement on a support plate P, all three segments can be transported by a common drive D assigned to the support plate. A drive assigned to the individual segment is not required. The drive can be designed as a motor or via a cylinder.

To exchange segment S3, all couplings K of the associated media supply must be detached; any couplings K to segments in the running-through direction L must also be detached. A segment is exchanged by transporting all three exchange segments S1, S3 and S5 on the common platform P perpendicular to the running-through line L in one of the two directions of the double arrow R2. If the roll table S1 is to be transported to the running-through line L, it must be transported to the left as seen from the running-through line L. If the roll table segment with a surface inspection device S5 is to be transported to the running-through line L, it must be transported to the right as seen from the running-through direction L. In both transport cases, the segments are transported simultaneously.

FIG. 2c shows an arrangement of the segments corresponding to FIG. 2b. The exchange segments of position 2 are coupled to one another via the common drive unit. This allows a central drive that is not assigned to an individual segment to move the segments together and synchronously. The coupling K can be taken over by a rod or similar forms; the drive can be designed as a motor or via a cylinder.

The number of segments arranged one behind the other in the running-through line L can be increased as desired in all of the exemplary embodiments of FIGS. 2a to 2c.

FIGS. 3a and 3b each show further exemplary embodiments for a device in accordance with the invention. In the exemplary embodiment in accordance with FIG. 3a, three segments are arranged in succession in the running-through line L. Thereby, in position 1, this is a gas-fired furnace segment S2, and in positions 2 and 3, each is a roll table segment S1. Each position 1 to 3 has its own assigned support structure 7 for two segments.

A support structure 8 is arranged parallel to the running-through direction L. The support structures 7 and 8 intersect. Further segments are arranged on the support structure 8, specifically an induction furnace segment S3, another gas-fired furnace segment S2 and a roll table with scorching device S6. All segments have individual drive devices D.

If the segment S1 of position 2 is to be changed, the associated installation space on the support structure 8 must initially be unoccupied, such that the segment S1 can be transported out of the running-through line L in the direction of the double arrow R2 onto the parallel support structure 8. The segment to be transported into the running-through line L is now positioned in front of the running-through line L at position 2. For this purpose, all segments located on the parallel support structure 8 are moved in a manner collision-free, preferably synchronously, in the direction of the double arrow R3, such that the segment to be exchanged is now located in front of the empty position 2. In the subsequent step, the segment to be exchanged can be transported in the direction of the double arrow R2 into the running-through line L and is thus in the operating position. Such successive work steps form a coherent operation and can be easily combined to form a partially or fully automated sequence of operations, which require only a small amount of time.

In the exemplary embodiment in accordance with FIG. 3b, three segments S1, S2 are arranged in succession in the running-through line L. Thereby, in position 1, this is a gas-fired furnace segment S2, and in positions 2 and 3, each is a roll table S1. Each position 1 to 3 has its own assigned support structure 7 for two segments.

A support structure 8 is arranged parallel to the running-through direction L. The support structures 7 and 8 intersect. Further segments are arranged on the support structure 8, specifically a roll table S1 and a further gas-fired furnace segment S2. The segments are arranged in a manner connected to one another on the common support plate P. None of the segments has an individual drive. A roll table segment with a water descaling device S7 is positioned at a parking position 9 in close proximity to the segments.

If the segment S2 is to be changed to position 1, the associated installation space on the support plate P must initially be unoccupied, such that the segment S2 can be transported out of the running-through line L in the direction of the double arrow R2 to the parallel support plate P. The segment that is to be transported into the running-through line L is now positioned in front of position 1. For this purpose, the support plate P is moved on the parallel support structure 8 in the direction of the double arrow R3, such that the segment to be exchanged is now in front of the empty position 1. Since the segments are transported together on the support plate P, a drive D is assigned only to the transport plate P and not to each segment. In the subsequent step, the segment to be exchanged can be transported in the direction of the double arrow R2 into the running-through line L and is thus in the operating position. Such successive work steps form a coherent operation and can be easily combined to form a partially or fully automated sequence of operations, which require only a small amount of time.

In this exemplary embodiment, the segments are transported in the direction of the double arrow R2 by means of a respective central drive D. The central drive D can be designed in the form of a cylinder or a motorized drive, which couples to the respective segment. This means that segments can also be moved individually without their own drive device.

The number of segments arranged one behind the other in the running-through line L can be increased as desired in both exemplary embodiments of FIG. 3a or 3b, as the case may be. Compared to the exemplary embodiment in accordance with FIGS. 2a and 2b, additional flexibility and an increased number of exchangeable segments can be achieved by the additional transport direction in accordance with double arrow R3.

Figure 2:
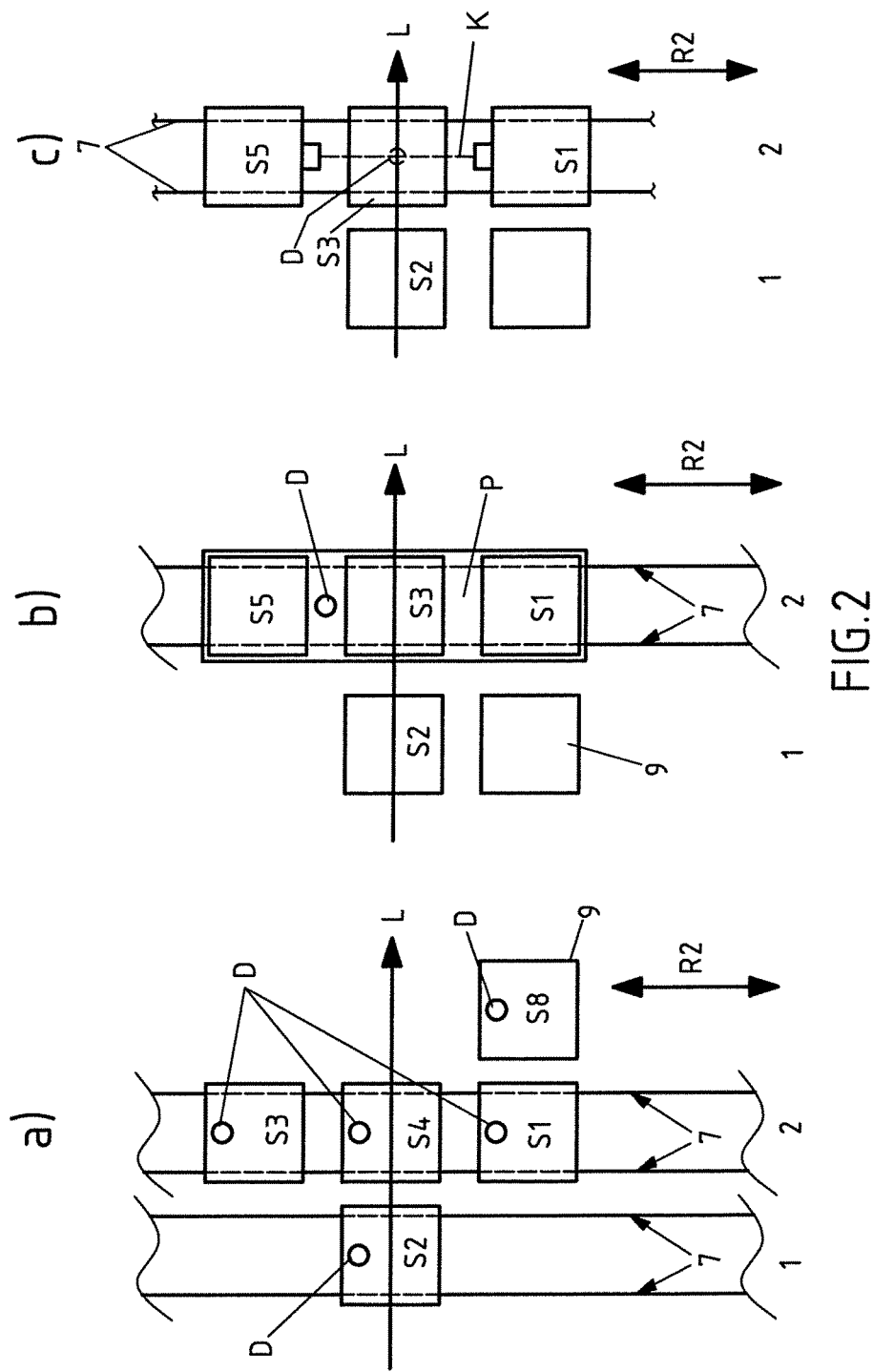
FIG. 2a is a system diagram of a heat treatment line with two exchangeable segments and a parking position.
FIG. 2b is a system diagram of a heat treatment line with one fixed segment, one exchangeable segment, and a parking position.
FIG. 2c is a system diagram showing an arrangement of segments corresponding to FIG. 2b.
Figure 3:
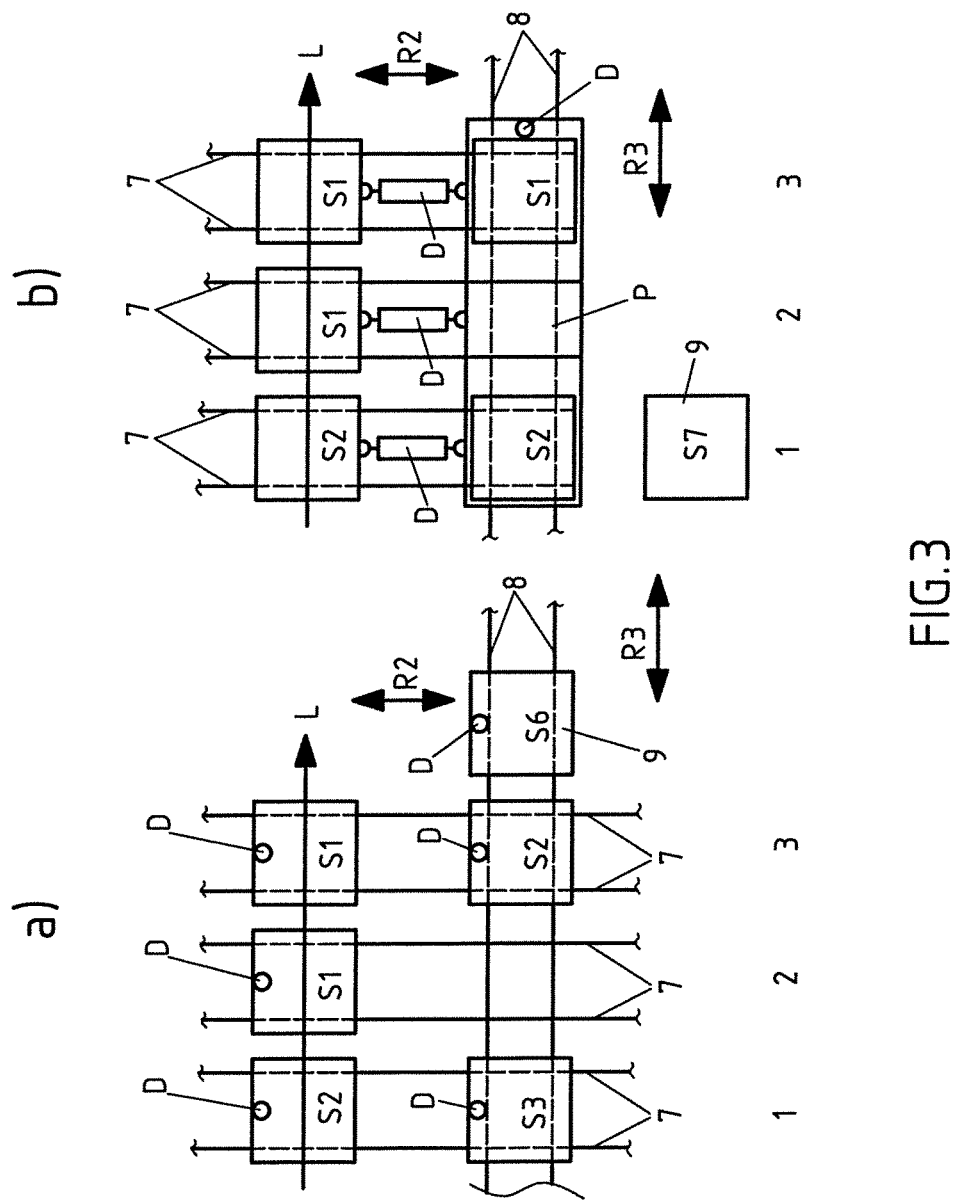
FIG. 3a is a system diagram of a heat treatment line with three exchangeable segments and intersecting support structures.
FIG. 3b is a system diagram of a heat treatment line with three exchangeable segments, intersecting support structures, and a parking position.

The transport operations for exchanging segments S described in FIGS. 1 to 3 can be used not only for adapting a temperature control; it is equally suitable for carrying out maintenance operations. If a defective segment S or a segment S intended for maintenance is removed from the running-through line L and replaced by another segment S, repair and maintenance work can be carried out with reduced downtimes. Any necessary cooling times and warm-up times can take place outside the running-through line L and do not impair the process control.

FIG. 4 shows an adaptation of the process control for different metal products and a corresponding schematic temperature curve, in connection with the control system ST. The metal product A is a metal product with which the material requires a high forming temperature. However, the surface requirements are comparatively low. The metal product B requires intermediate cooling and short and rapid heating before the pass in the finishing stand, in order to adjust a special microstructure. Furthermore, the surface is descaled in a controlled manner. For the metal product A, the system diagram consists of a device with 6 segments. Segment 1 is a roll table S1, followed by two furnace segments S2, two enclosed roll tables S4 and one furnace segment with an inductive heater S3. The metal product B is produced with variation of the system diagram of A. Segment 1 is replaced by a roll table with a surface inspection device S5. The furnace segment S2 at position 3 is replaced by intensive cooling with a hydrogen atmosphere S8. Subsequently, surface defects detected with a scorching device S6 are removed. Subsequent heating is carried out with an induction furnace segment S3, followed by an enclosed roll table S4 for temperature uniformity. The changeover between the two process controls can take place within 5 min by exchanging the segments.

On the basis of these different process controls, it becomes clear that flexible process control can be adjusted. Similarly, the importance of calculating the necessary combination of the six segments by the higher-level control system ST becomes clear.

The higher-level control system ST receives a data set on a target product to be manufactured, which comprises essential geometric data, in particular data regarding material properties, such as metallurgical and/or surface-related properties. Depending on the design variant of the control system ST, the data for the necessary process control, such as the temperature sequences for the metal product A, are already contained in the data set for the target product, and the control system ST only initiates the exchange of the segments. In another design variant, the data set supplied to the control system ST does not contain any finished information regarding the required process control. In such a case, the control system ST makes the necessary calculations for process control itself and subsequently initiates the necessary composition of the segments. Such calculation can be carried out in isolation in the control system; preferably and with regard to the overall outfitting of a system with calculation units and models, the link to further calculation systems, models, databases etc. shown in dashed lines in FIG. 4 is sensibly provided. The data exchange with other models and databases can support and simplify the calculation by the control system; if necessary, the control system can fall back on already existing calculations, for example by a temperature model or surface model, and combine them into an overall view.

The calculation by the control system ST can be done online for running production and/or offline. The offline calculation is expediently linked with production planning, such that products with which process control does not involve segment exchange can be manufactured in a closed sequence, limiting the total number of exchange operations for increased productivity.

REFERENCE SIGNS

1 Position for different segments
2 Position for different segments
3 Position for different segments
4 Position for different segments
5 Position for different segments
6 Position for different segments
7 Support structure perpendicular to the running-through line
8 Support structure parallel to the running-through line
9 Parking position
A Metal product
B Metal product
L Running-through line
S Segment
S1 Roll table
S2 Furnace segment, gas-fired
S3 Furnace segment, inductive
S4 Roll table, enclosed
S5 Roll table with a surface inspection device
S6 Roll table with a scorching device
S7 Roll table with a water descaling device
S8 Rapid cooling device
T Transport device
ST Control system
D Drive device
P Platform
R1 Arrow—transport direction
R2 Double arrow—transport direction
R3 Double arrow—transport direction
K Coupling

The invention claimed is:

1. A device by which a process control, in particular a temperature control, of a metal product, in particular a slab, thin slab or pre-rolled hot strip, which is passed through along a single running-through line (L) is flexibly influenced, comprising:

at least two segments(S) arranged one behind the other in the running-through direction (L), wherein at least one segment(S) is designed as a furnace (S2, S3), an enclosed transport section (S4), an open transport section (S1) and/or a cooling section (S8), wherein a further furnace segment (S2, S3) can be positioned next to a first furnace segment (S2, S3), wherein at least one segment(S) can be exchanged by a transport device (T) comprising at least one drive unit, wherein one segment(S) can be exchanged for another segment(S) by the transport device (T) by means of a transport operation in one continuous operation, wherein the segments(S) exchangeable with one another are arranged on a common support structure (7, 8), and wherein the support structure (7, 8) has at least one coupling (K) and/or at least one support plate (P) for connecting a plurality of segments(S) to one another.

2. The device according to claim 1,
wherein one segment(S) can be simultaneously exchanged for another by the transport device (T) by a transport operation.

3. The device according to claim 1,
wherein the segments(S) are attached to the support structure (7, 8) in a movable and/or detachable manner.

4. The device according to claim 1,
wherein a segment(S) can be attached to the support structure (7, 8) from an external position (9).

5. The device according to claim 1,
wherein ≥3 segments(S) can be attached to the support structure (7, 8).

6. The device according to claim 1,
wherein at least one segment(S) has rollers for conveying the metal product along the running-through line (L).

7. The device according to claim 1,
wherein a furnace segment (S3) has an inductive heater.

8. The device according to claim 1,
wherein a furnace segment (S2, S3) has at least one furnace door for sealing a furnace chamber from the atmosphere.

9. The device according to claim 1,
wherein a segment(S) has a measuring device for recording a surface quality.

10. The device according to claim 1,
wherein a segment(S) has a device for treating a surface (S6, S7) by scorching, descaling, blowing off and/or grinding.

11. The device according to claim 1,
wherein at least one segment(S) has a positioning means for aligning the segment(S) in the running-through line.

12. A device by which a process control, in particular a temperature control, of a metal product, in particular a slab, thin slab or pre-rolled hot strip, which is passed through along a single running-through line (L) is flexibly influenced, comprising:

at least two segments(S) arranged one behind the other in the running-through direction (L), wherein at least one segment(S) is designed as a furnace (S2, S3), an enclosed transport section (S4), an open transport section (S1) and/or a cooling section (S8), wherein a further furnace segment (S2, S3) can be positioned next to a first furnace segment (S2, S3), wherein at least one segment(S) can be exchanged by a transport device (T) comprising at least one drive unit, wherein one segment(S) can be exchanged for another segment(S) by the transport device (T) by means of a transport operation in one continuous operation, wherein the segments(S) exchangeable with one another are arranged on a common support structure (7, 8), and wherein adjacent segments(S) have complementary coupling components (K) for detachably connecting the segments(S) to one another.

13. The device according to claim 1,
wherein all of the segments(S) of the device are exchangeable by the transport device (T).

14. The device according to claim 1,
wherein at least one roll stand of a hot-rolling train is arranged at a beginning of the running-through line (L).

15. The device according to claim 1,
wherein at least one roll stand of a hot-rolling train is arranged at an end of the running-through line (L).

16. The device according to claim 1,
wherein a control or regulation system (ST) for the segments(S) along with the transport device (T) is present.

17. A method for influencing a process control, in particular a temperature control, of a metal product (A, B), in particular a slab, thin slab or a pre-rolled hot strip, which is passed through along a running-through line, by at least two segments(S) arranged one behind the other in the running-through line (L), wherein the process control, in particular temperature control, is changed along the running-through direction (L) of the metal product (A, B) by exchanging one segment(S), and wherein the exchange of a segment(S) for another segment(S) by a transport operation is carried out in one continuous operation by a transport device (T), and wherein the segments(S) arranged on a common support structure (7, 8) are moved while being connected to one another with a coupling (K) and/or arranged on a support plate (P).

18. The method according to claim 17,
wherein the segments(S) are exchanged within 5 min.

19. Method according to claim 17,
wherein a higher-level control or regulation system (ST) influences the process control, and on based on predetermined data automatically causes a segment(S) to be exchanged and/or acts on an individual segment(S) in order to change the temperature control.

20. The method according to claim 17,
wherein the control or regulation system (ST) determines suitable materials of the metal products (A, B) for the segments(S) present in the running-through line.

21. The method according to claim 17,
wherein the control or regulation system determines segments(S) to be arranged for a material of the metal product (A, B) in the running-through line.

22. The method according to claim 17,
wherein the metal product (A, B) is transported along the running-through line (L) by rollers.

* * * * *